(12) United States Patent
Goldstein

(10) Patent No.: US 9,252,616 B2
(45) Date of Patent: Feb. 2, 2016

(54) ZINC-AIR BATTERY

(75) Inventor: Jonathan Russell Goldstein, Jerusalem (IL)

(73) Assignee: PHINERGY LTD., Lod (IL)

( * ) Notice: Subject to any disclaimer, the term of this patent is extended or adjusted under 35 U.S.C. 154(b) by 758 days.

(21) Appl. No.: 13/516,125

(22) PCT Filed: Dec. 13, 2010

(86) PCT No.: PCT/IL2010/001047
§ 371 (c)(1),
(2), (4) Date: Jul. 16, 2013

(87) PCT Pub. No.: WO2011/073975
PCT Pub. Date: Jun. 23, 2011

(65) Prior Publication Data
US 2013/0285597 A1  Oct. 31, 2013

Related U.S. Application Data (60) Provisional application No. 61/286,151, filed on Dec. 14, 2009.

(51) Int. Cl.
| | |
|---|---|
| *H01J 7/00* | (2006.01) |
| *H02J 7/00* | (2006.01) |
| *H01M 2/38* | (2006.01) |
| *H01M 10/42* | (2006.01) |
| *H01M 10/44* | (2006.01) |
| *H01M 10/46* | (2006.01) |
| *H01M 12/08* | (2006.01) |

(52) U.S. Cl.
CPC ............... *H02J 7/0052* (2013.01); *H01M 2/38* (2013.01); *H01M 10/425* (2013.01); *H01M 10/44* (2013.01); *H01M 10/46* (2013.01); *H01M 12/08* (2013.01); *H02J 7/0042* (2013.01)

(58) Field of Classification Search
CPC .......... H01M 4/42; H01M 2008/1095; H01M 2300/0014; H01M 12/085; Y02E 60/122; Y02E 60/50; Y02E 61/124
USPC ........................................................ 320/107
See application file for complete search history.

(56) References Cited

U.S. PATENT DOCUMENTS

| | | | |
|---|---|---|---|
| 4,132,619 A | 1/1979 | Klein et al. | |
| 5,228,958 A | 7/1993 | Goldstein et al. | |
| 5,378,329 A | 1/1995 | Goldstein et al. | |
| 5,849,427 A * | 12/1998 | Siu et al. | 429/404 |
| 6,162,555 A * | 12/2000 | Gutierrez et al. | 429/404 |
| 6,517,967 B1 | 2/2003 | Shrim et al. | |
| 2003/0213690 A1 | 11/2003 | Smedley et al. | |
| 2004/0053132 A1* | 3/2004 | Smedley | H01M 4/42 429/229 |
| 2005/0123815 A1 | 6/2005 | Tsai et al. | |
| 2006/0127731 A1 | 6/2006 | Faris | |
| 2007/0141467 A1 | 6/2007 | Durkot et al. | |
| 2010/0196768 A1* | 8/2010 | Roberts et al. | 429/406 |

OTHER PUBLICATIONS

Supplementary European Search Report for European Patent Application No. 10837159 mailed on Feb. 25, 2014.

* cited by examiner

*Primary Examiner* — Nghia Doan
(74) *Attorney, Agent, or Firm* — Pearl Cohen Zedek Latzer Baratz LLP

(57) ABSTRACT

A zinc-air cell, a battery which is a low weight, low volume, or high energy system, or a combination thereof, and an apparatus for recharging the same are disclosed.

16 Claims, 6 Drawing Sheets

Fig.8
Side View Schematic

Top View Schematic

ZINC-AIR BATTERY

RELATED APPLICATIONS

The present application is a U.S. National Phase Application of International Application No. PCT/IL2010/001047 (filed 13 Dec. 2010) which claims priority to U.S. Provisional No. 61/286,151 (filed 14 Dec. 2009) which are hereby incorporated by reference in their entirety.

FIELD OF THE INVENTION

This invention provides zinc-air cells, zinc-air batteries and an apparatus for recharging the same, which is a low weight, low volume, or higher energy system, or a combination thereof.

BACKGROUND OF THE INVENTION

It is known that metal-air batteries present remarkable characteristics which make them suitable for a number of important uses and that rechargeable zinc-air batteries are well known in the art. In one approach, the battery is recharged solely by application of electric current, however the zinc electrode (in practically relevant limited—electrolyte conditions), does not maintain a compact shape on repeated charge-discharge cycling, either forming zinc dendrites, which short out the cell, or the electrode undergoes zinc shape change, where the zinc tends to redistribute over the lower part of the plate with consequent capacity fading and stack deformation.

Air electrodes based on carbon bonded by polymer have limited life when exposed to the rigors of charge-discharge cycling, especially on erosive oxygen evolution on charge. The previous designs often needed also to carry an electrolyte pump, excess zinc and excess electrolyte in the battery as means to prolong cycle life, but this lowers attainable energy dimities to around 100-150 Wh/kg.

In another approach, the battery is mechanically refueled by replacing spent anodes and electrolyte in the cell each cycle and recycling spent anodes back to zinc anodes off-board in a recycling process. Energy densities of 250 Wh/kg have been achieved.

Air electrodes to date have limited cycle life when exposed to the massive physical shock of replacement of zinc anodes in each cell, electrolyte leakage is difficult to prevent in such a disassembly-structured system, and again the need for excess zinc and excess electrolyte in the cell negatively impacts energy density.

To date, a high energy density zinc-air battery, with a useful minimum zinc and alkaline electrolyte quantity, which is compact and rechargeable is lacking.

SUMMARY OF THE INVENTION

This invention provides, in some embodiments, a zinc-air cell, battery and apparatus for recharging the same, which achieves improved energy/weight and energy/volume for the system, is a low weight, low volume, or higher energy system, or a combination thereof.

In one embodiment, this invention provides an apparatus for charging a zinc-air cell or zinc-air battery, said apparatus comprising:
a reservoir, said reservoir comprising:
  a zinc-containing electrolyte fluid;
an export feed operationally connected to said reservoir;
a fluid drainer; and
optionally a second discharge reservoir;
whereby:
  said apparatus is operationally connectible to said zinc-air cell or zinc-air battery for which charging is desired;
  said reservoir of said apparatus is located externally to a device containing a zinc-air cell or zinc-air battery for which charging is desired and said export feed allows for the delivery of said zinc-containing electrolyte fluid from said reservoir to said zinc-air cell or zinc-air battery for which charging is desired;
  said fluid drainer is operationally connectible to said device containing said zinc-air cell or zinc-air battery and facilitates draining of at least a portion of an electrolyte fluid located in a discharged or not fully charged zinc-air cell or zinc-air battery in said device; and
  said drained electrolyte fluid is conveyed to said reservoir or optionally said drained electrolyte fluid is conveyed to said second discharge reservoir.

In some embodiments, the apparatus further comprises at least one pumping element, which pumping element facilitates delivery of said zinc-containing alkaline electrolyte fluid from said reservoir to said zinc-air cell or zinc-air battery for which charging is desired, or which pump facilitates draining of at least a portion of an electrolyte fluid located in a discharged or not fully charged zinc-air cell or zinc-air battery in said device, or a combination thereof.

In some embodiments, the apparatus further comprises a power supply for applying voltage which power supply is operationally connectible to said zinc-air cell or zinc-air battery.

In some embodiments, the apparatus further comprises a controller for modulating fluid pressure, fluid flow, fluid capacity, electrolyte temperature, voltage, current, the zinc concentration in the electrolyte solution applied, or a combination thereof.

In some embodiments, any zinc-air cell may be used in conjunction with the apparatuses of this invention.
In some embodiments, the zinc-air cell will comprise
at least one zinc incorporating structure as the anode of said cell;
at least one porous structure capable of absorbing oxygen from the air as the cathode of said cell;
a casing in which said anode and cathode are positioned further comprising an electrolyte fluid; and
an inlet and outlet in said casing, whereby said inlet and outlet are constructed so as to permit exchange of said electrolyte fluid in said cell with an electrolyte fluid located in an off-board reservoir;
wherein said anode and cathode are electrically connectible across a load and wherein said zinc-containing electrolyte fluid in said reservoir is comprised of zinc-oxide.

In some embodiments, according to this aspect, the zinc-air cell will further comprise at least a first separator positioned within said cell between said anode and said cathode.
In some embodiments, the zinc-air cell comprises:
a casing;
at least one porous structure capable of absorbing oxygen from the air as the cathode of said cell placed within said casing;
a slurry consisting essentially of zinc and electrolyte solution placed within said casing;
a separator positioned between said porous structure and said slurry;

at least one current collecting electrode placed in said casing and in contact with said slurry;

optionally comprising one or more porous tubes placed in said casing and in contact with said slurry, facilitating electrolyte solution passage there-through; and comprising an inlet and outlet in said casing, whereby said inlet and outlet are constructed so as to permit exchange of said slurry, introduction and exchange of electrolyte fluid or a combination thereof in said cell with a slurry, an electrolyte fluid, or a combination thereof located in an off-board reservoir.

In some embodiments, the solution may further comprise other elements, such as, for example, zinc oxide in solution, inhibitors for corrosion, extenders to allow maximum solubility of the zinc oxide, for example, such as sodium silicate, inert conductors, flow aids, gelling agents, and other materials, as will be appreciated by the skilled artisan. In some embodiments, when zinc alloys are used in the cells as described herein the solution may further comprise some of the components in the alloy, as well.

In some embodiments, in accordance with the invention, the same principles described herein for an apparatus for recharging a zinc-air battery may be adapted for other metal-air batteries, as well, for example, when the cathode comprises a metal slurry in solution, such slurry may comprise aluminum or iron in an alkaline potassium hydroxide solution and the air cell would therefore be an iron-air or aluminum-air cell, which air cell would function as would a zinc-air cell, and which metal-air cell would be interchangeable in the apparatus and in accordance with the methods of this invention. Other slurries based on aluminum, magnesium or silicon are feasible and electrolytes may be selected from KOH, NaOH, salt solutions and ionic liquids.

In some embodiments, the zinc-air cell comprises:
at least one zinc-containing anode;
at least one porous structure capable of absorbing oxygen from the air as the cathode of said cell;
optionally at least a first separator positioned within said cell between said anode and said cathode
a casing in which said anode and cathode are positioned, further comprising an alkaline electrolyte fluid;
an inlet; and
an outlet;
wherein said inlet and said outlet are located within and traverse said casing, whereby said inlet and outlet are constructed so as to permit exchange of said electrolyte fluid in said cell with an electrolyte fluid located in an off-board reservoir and wherein said anode and cathode are electrically connectible across a load and said zinc-containing electrolyte fluid is comprised of zinc oxide.

In some embodiments, the apparatus further comprises an electrically floating metal substrate coated with an electrocatalyst, which facilitates hydrogen evolution in the presence of zinc, thereby preventing buildup of particulate zinc within said casing.

In some embodiments, the apparatus further comprises a temperature regulator, which temperature regulator controls the temperature of the electrolyte fluid in the reservoir.

In some embodiments, the apparatus further comprises a flow regulator, which flow regulator controls the flow speed or pressure of electrolyte fluid conveyed from said reservoir or fluid conveyed to said reservoir.

In some embodiments, the apparatus further comprises a filter, which filter is operationally connected to said fluid drainer and thereby filters electrolyte fluid conveyed from said air cell, said export feed and thereby filters electrolyte fluid conveyed to said air cell, or a combination thereof.

In some embodiments, the invention provides a method for recharging a zinc-air cell or zinc-air battery, said method comprising:
contacting a zinc-air cell or zinc-air battery with an apparatus as herein described, such that:
said export feed of said apparatus is operationally connected to said zinc-air cell and electrolyte fluid can thereby be conveyed from said reservoir to said zinc-air cell; and
said fluid drainer is operationally connected to said zinc-air cell and electrolyte fluid from said zinc-air cell can be conveyed out of said zinc-air cell thereby;
promoting conveyance of zinc-containing electrolyte fluid from said reservoir to said zinc-air cell via said export feed; and
promoting conveyance of electrolyte fluid from said zinc-air cell to said apparatus via said fluid drainer.

In some embodiments, the apparatus further comprises a power supply and said method further comprises applying voltage to said zinc-air cell. In some embodiments, the method further comprises applying voltage to said zinc-air cell following conveyance of said zinc-containing electrolyte fluid from said reservoir to said zinc-air cell via said export feed.

In some embodiments, this invention provides a zinc-air cell comprising:
a zinc-containing anode comprising:
at least one electrically conducting porous support for zinc incorporation there-within;
a porous polymer-based mat positioned proximally to said porous support; and
an outer coating, mesh or wire assembly positioned proximally to said porous polymer-based mat and distal to said porous support and comprising an electrocatalyst for hydrogen evolution in the presence of zinc, at least one porous structure capable of absorbing oxygen from the air as the cathode of said cell;
a casing in which said anode and cathode are positioned further comprising an alkaline electrolyte fluid;
optionally an inlet and outlet in said casing, whereby said inlet and outlet are constructed so as to permit exchange of said electrolyte fluid in said cell with an electrolyte fluid located in an off-board reservoir; and
optionally at least a first separator positioned within said cell between said anode and said cathode
wherein said anode and cathode are electrically connectible across a load.

In some embodiments this invention provides a metal-air cell comprising:
a casing comprising an inlet and an outlet;
at least one porous structure capable of absorbing oxygen from the air as the cathode of said cell placed within said casing;
a slurry consisting of potassium hydroxide solution and zinc, iron or aluminum placed within said casing;
a separator positioned between said porous structure and said slurry;
elongated conductors placed in said casing and in contact with said slurry;
at least one porous tube which is placed in said casing, in contact with said slurry, and spans a said casing such that a portion of said porous tube protrudes from said casing, wherein said porous tube is so constructed so as to facilitate potassium hydroxide solution passage there-through; and
wherein said anode and cathode are electrically connectible across a load and whereby said inlet and outlet permit exchange of said slurry, introduction and exchange of electrolyte fluid or a combination thereof in said cell with a slurry, an electrolyte fluid, or a combination thereof located in an off-board reservoir. In some embodiments, according to this aspect, the metal-air cell may further comprise at least one agitator.

BRIEF DESCRIPTION OF THE DRAWINGS

Various embodiments of the subject apparatuses, zinc air cells and zinc air batteries are described herein with reference to the figures wherein.

DETAILED DESCRIPTION OF THE INVENTION

This invention provides, in some embodiments, a system, battery and cell which may yield improved energy/weight, or energy/volume. The invention provides, in some embodiments, for a minimal element, or in some embodiments, for a low volume metal-air cell, which is connectible to a charging station, which allows for a battery and metal-air cells to be designed as compact primary batteries, with their inherent higher energy densities, yet are fully rechargeable and thereby environmentally friendly and cost-effective.

Some embodied key cell features achieving high energy density are the metal inventory, for example, the zinc inventory, where little spare zinc may be needed in the cell to maintain design capacity rating, since in each cycle the zinc may returned to essentially its pristine state for the next discharge and the electrolyte and inter-electrode spacing may be kept to the minimum, assuming a low volume cell design. In some embodiments, the electrolyte content may be kept as low as 0.5 cc-1 cc/Ah, basically a starved electrolyte in the cell in which the cell discharge reaction product is mainly ZnO, see Eq. 1. According to this embodiment, such apparatus and cell design provides an additional benefit in reducing the need for auxiliary elements, as discussed further herein below, in order to reach energy densities at the battery level (energy/unit weight) towards 350 Wh/kg, and energy per unit volume (specific energy) towards 800 Wh/L.

$$2Zn + O_2 = 2ZnO \qquad \text{Eq. 1}$$

The apparatus, methods, batteries and cells of this invention allow for a primary cell configuration, which in turn provides weight savings over prior art rechargeable zinc-air systems, also in terms of auxiliary elements necessary on board the device in which the cell/battery is utilized. Such auxiliary elements may include, for example, a pump, heat management system, water management system, CO2 scrubbing systems or any other auxiliary element typically seen in other onboard battery devices.

In accordance with the apparatus/system/batteries and cells of this invention, since the battery is returned to recharging-system each cycle, where water, CO2 laden electrolyte etc. can be treated and/or replenished, such auxiliary systems can be dispensed with or be minimal. It should be noted that since the recharging-system comprises an off-board electrolyte reservoir, to feed the cell on the electrically/hydraulically recharge mode, the temperature control mechanisms may be located off-board, on the recharging-system.

Thus in some embodiments, the invention provides a metal air cell comprising:
  at least one metal-containing anode;
  at least one porous structure capable of absorbing oxygen from the air as the cathode of said cell;
  optionally at least a first separator positioned within said cell between said anode and said cathode
  a casing in which said anode and cathode are positioned, further comprising an alkaline electrolyte fluid;
  an inlet; and
  an outlet;
    wherein said inlet and said outlet are located within and traverse said casing, whereby said inlet and outlet are constructed so as to permit exchange of said electrolyte fluid in said cell with an electrolyte fluid located in an off-board reservoir and wherein said anode and cathode are electrically connectible across a load.

In some embodiments, the invention provides a zinc air cell comprising:
  at least one zinc-containing anode;
  at least one porous structure capable of absorbing oxygen from the air as the cathode of said cell;
  optionally at least a first separator positioned within said cell between said anode and said cathode
  a casing in which said anode and cathode are positioned, further comprising an alkaline electrolyte fluid;
  an inlet; and
  an outlet;
  wherein said inlet and said outlet are located within and traverse said casing, whereby said inlet and outlet are constructed so as to permit exchange of said electrolyte fluid in said cell with an electrolyte fluid located in an off-board reservoir and wherein said anode and cathode are electrically connectible across a load.

According to this aspect, and in some embodiments, the cell structure or battery structure comprising the metal-air cells allows for regeneration or renewal of the metal anode, for example a zinc anode, by exchange, or pumping of the alkaline electrolyte solution. In some embodiments, according to this aspect, the alkaline electrolyte solution may comprise potassium hydroxide. In some embodiments, the cell will comprise at least one air electrode and a rechargeable minimal zinc-air cell as herein described. Such minimal zinc-air or metal-air cell is so termed, since the structure and arrangement is similar to that of a primary battery placed within a device utilizing the cell/battery, yet such cell/battery is rechargeable, by connection to an off-board apparatus, as herein described. The apparatus allows for the collection of particulates or aggregated by-products for example, sinking or present at the bottom of the cells/batteries of the invention, and cleansing of the surfaces is enabled in the design of the cells/batteries of this invention.

According to this aspect, and in one embodiment, the renewal or regeneration of the cell/battery surfaces, including the anode surface, may be accomplished via application of the electrolyte solution, containing, for example, dissolved zinc oxide well below its maximum solubility, which enables stripping of zinc oxide from the zinc anode for example prior to zinc re-plating. In another, embodiment, plating of the zinc may be accomplished by charging the electrodes when the cell is connected to a charging station as described herein, concurrent with the application of the electrolyte solution.

Cells which may be suited for such recharging, yet are present in a low volume configuration in the systems, apparatuses/batteries of this invention include:

a zinc-air cell (I) comprising:
at least one zinc incorporating structure as the anode of said cell;
at least one porous structure capable of absorbing oxygen from the air as the cathode of said cell;
a casing in which said anode and cathode are positioned further comprising an alkaline electrolyte fluid;
an inlet and outlet in said casing, whereby said inlet and outlet are constructed so as to permit exchange of said electrolyte fluid in said cell with an electrolyte fluid located in an off-board reservoir; and
at least a first separator positioned within said cell between said anode and said cathode
wherein said anode and cathode are electrically connectible across a load.

a zinc-air cell (II) comprising:
a casing;
at least one porous structure capable of absorbing oxygen from the air as the cathode of said cell placed within said casing;
a slurry consisting essentially of zinc and potassium hydroxide solution placed within said casing;
a separator positioned between said porous structure and said slurry;
optionally comprising at least one elongated current collecting substrate placed in said casing and in contact with said slurry;
optionally comprising porous tubes placed in said casing and in contact with said slurry, facilitating potassium hydroxide solution passage there-through; and
optionally comprising an inlet and outlet in said casing, whereby said inlet and outlet are constructed so as to permit exchange of said slurry, introduction and exchange of electrolyte fluid or a combination thereof in said cell with a slurry, an electrolyte fluid, or a combination thereof located in an off-board reservoir; and
wherein said anode and cathode are electrically connectible across a load. In some embodiments, the electrolyte solution may further comprise zinc oxide, inhibitors for corrosion, antifoaming agents, extenders to allow maximum solubility of zinc oxide, e.g. sodium silicate, inert conductors or flow aids, and optionally alloyed components in the zinc, when the anode comprises a zinc alloy slurry.

a zinc-air cell (III) comprising:
at least one zinc-containing anode;
at least one porous structure capable of absorbing oxygen from the air as the cathode of said cell;
optionally at least a first separator positioned within said cell between said anode and said cathode
a casing in which said anode and cathode are positioned, further comprising an alkaline electrolyte fluid;
an inlet; and
an outlet;
wherein said inlet and said outlet are located within and traverse said casing, whereby said inlet and outlet are constructed so as to permit exchange of said electrolyte fluid in said cell with an electrolyte fluid located in an off-board reservoir and wherein said anode and cathode are electrically connectible across a load.

Figure 1:
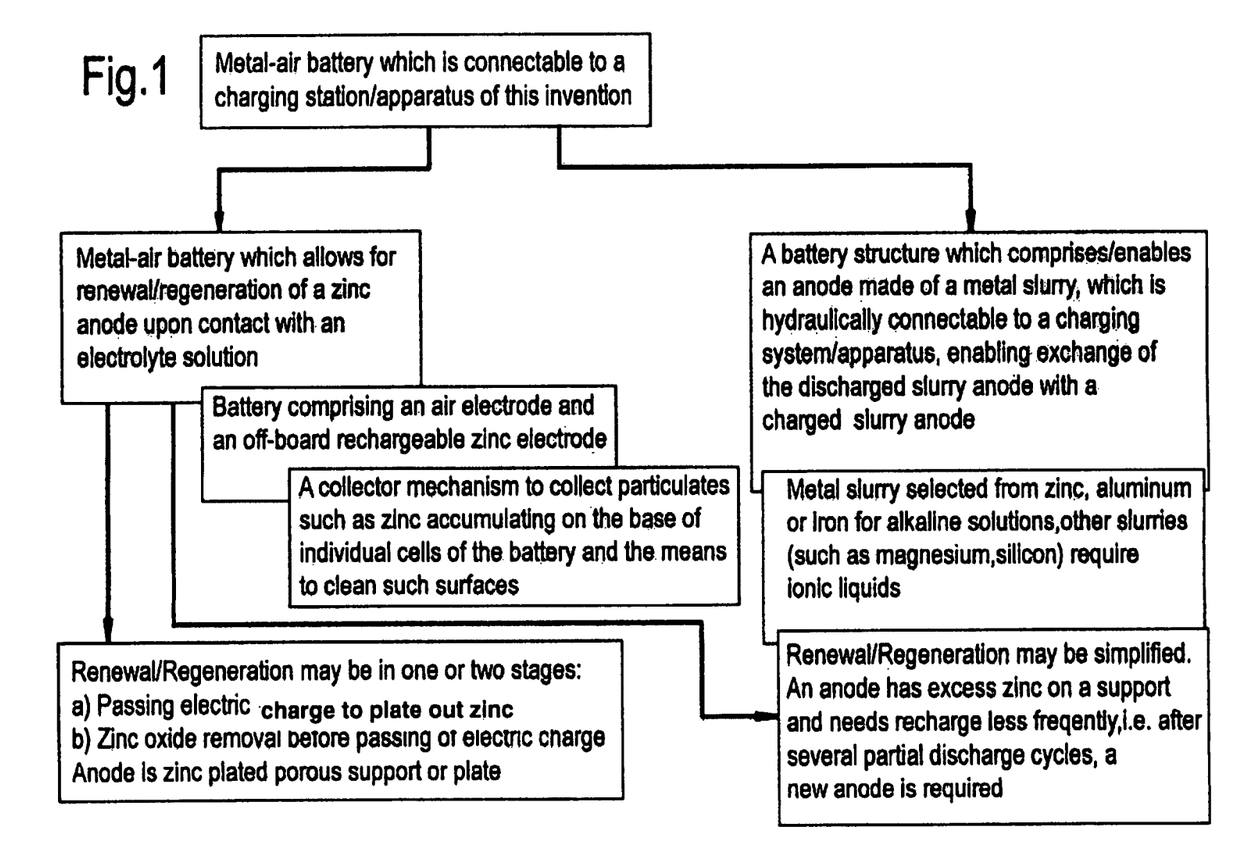
FIG. 1 schematically depicts applications of a metal-air battery in accordance with this invention.
Figure 2:
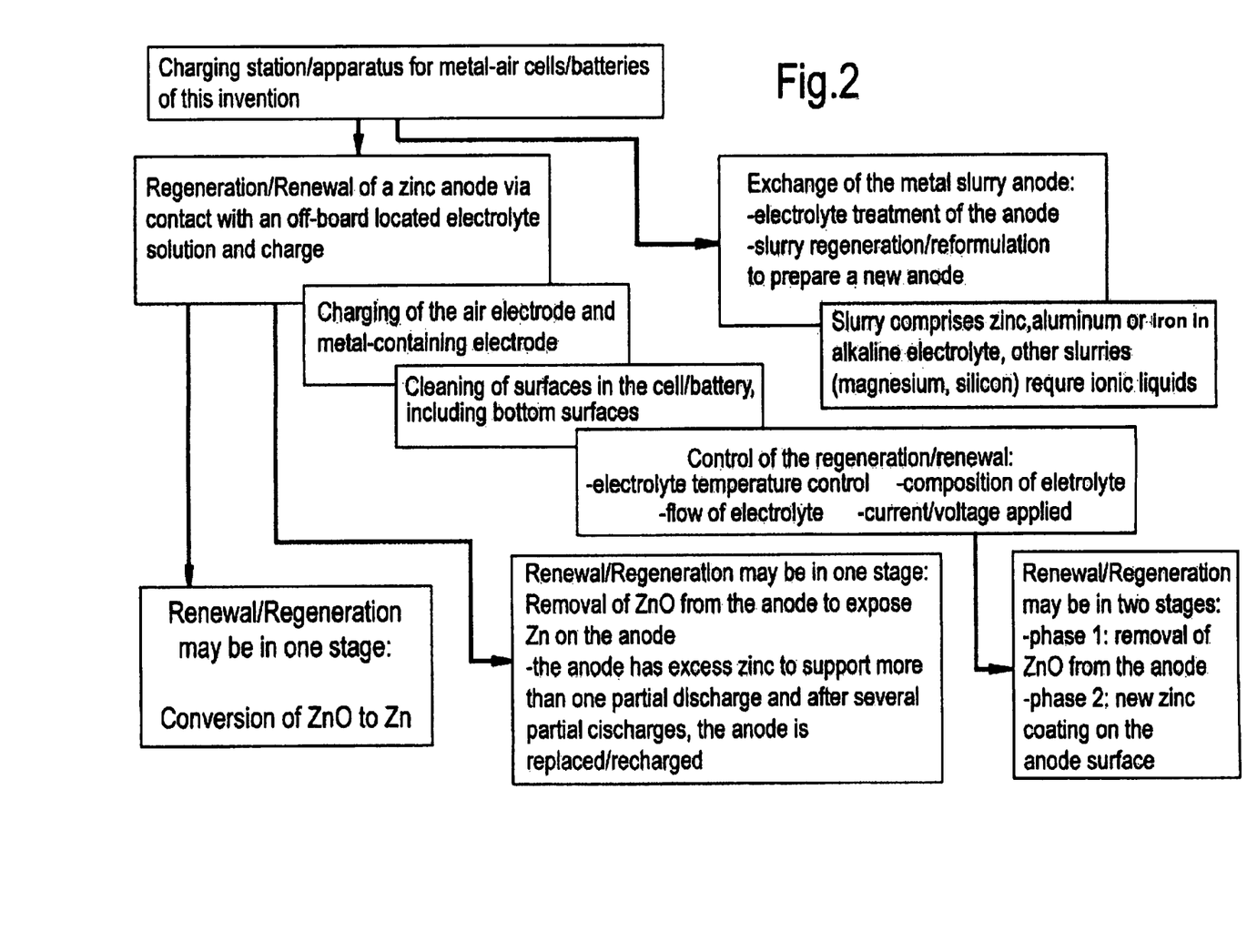
FIG. 2 schematically depicts applications of the apparatuses/charging stations in accordance with this invention.

FIG. 1 provides a scheme for the application of metal air cells/batteries envisioned for use in accordance with the methods/apparatuses/systems of this invention and FIG. 2 provides a scheme for the incorporation of the metal-air cell/batteries within the apparatuses of this invention to effect recharging low volume metal-air/zinc-air batteries, in accordance with the methods of this invention.

Figures 3, 4:
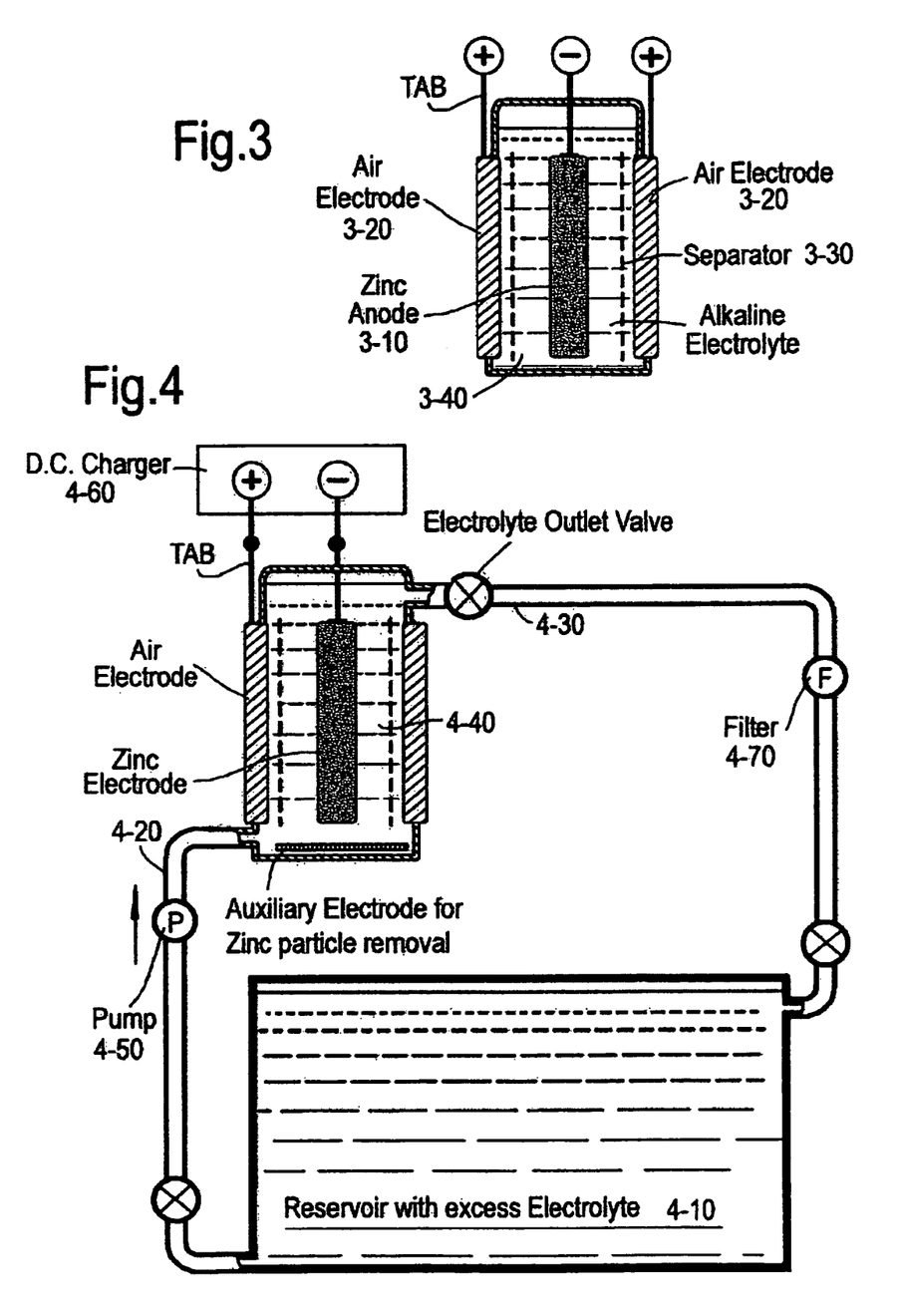
FIG. 3 depicts a simple metal-air cell
FIG. 4 depicts a simple metal-air cell operationally connected to an embodiment of an apparatus as herein described.

Referring now to FIG. 3, a zinc air cell is basically designed in primary (discharge only mode) with a useful low volume zinc and alkaline electrolyte (KOH) quantity for the desired capacity, which makes for a high energy density. As depicted the zinc electrode 3-10 is the anode and is positioned medially between two air electrodes 3-20, and a separator 3-30 is placed between the zinc electrode and each air electrode. The electrodes are placed in a casing, filled with a low volume of electrolyte solution 3-40.

In some embodiments, such zinc-air cells may be referred to herein as "minimal element zinc-air cells", which will be understood to refer to a zinc-air cell comprising a small spacing between electrodes, low volume of electrolyte solution and minimal components necessary to operate the cell/battery and thereby achieve highest energy density possible for the configuration chosen.

In such a starved electrolyte condition on discharge, the zinc forms zinc oxide (ZnO). The cell/battery, however, may be further hydraulically, operationally connected to an apparatus, which is located external to the device in which the battery/cell is found. The apparatus comprises a reservoir of electrolyte solution (for example, KOH with dissolved zinc oxide) and optionally an off-board pump.

An embodiment of a connection of a schematic depiction of an apparatus of this invention is presented in FIG. 4. The electrolyte solution is conveyed through the cell, for example, an export feed 4-20 operationally connected to the reservoir 4-10 conveys electrolyte in, while a fluid drainer 4-30 is operationally connected to the device containing the zinc-air cell or zinc-air battery and facilitates draining of at least a portion of an electrolyte fluid 4-40 located in a discharged or not fully charged zinc-air cell or zinc-air battery in said device. The draining of the native electrolyte contained in the zinc-air cell/battery may be concurrent with the conveyance of the electrolyte fluid from the reservoir, or it may follow, or such introduction of electrolyte solution from the reservoir and drainage of the electrolyte solution from the battery/cell may be cycled, in a start and stop mode, and any of such means of introducing the electrolyte fluid from the reservoir to the battery/cell and drainage of the electrolyte fluid from the battery/cell may be envisioned to encompass an embodiment of the invention.

The electrolyte solution may be pumped through the cell/battery 4-50, and in some embodiments, charging current is passed through the cell concurrently 4-60, or following an initial electrolyte solution exchange, as described. Charging is passed through the cell in the usual way, i.e., zinc electrode negative, air electrode positive as depicted for example in FIG. 4 (electrical connection to the right-hand air electrode is not shown). Since the electrolyte is greatly in excess and flows through the cell, there is formed a well behaved uniform dendrite-free deposition of zinc on the plate (as if deposition had occurred under the optimum conditions of a plating bath). Desired parameters of the deposit such as thickness and porosity can be adjusted based on charging conditions and electrolyte additives, as is well known in the art. Once the zinc has deposited, the hydraulic connection with the external reservoir and its pump is broken, and the cell is ready with refreshed zinc electrode and remaining (starved) electrolyte inventory for high energy density discharge in primary mode. Such a replaceable energy battery is a candidate to work in tandem with a conventional electrically rechargeable power battery in a full EV system.

In some embodiments, the apparatus may comprise and a metal-air/zinc-air cell/battery may make use of a controller for the application of current/voltage to the systems as herein described.

In some embodiments, since zinc oxide is the discharge product and is readily soluble in excess electrolyte, one use mode is to flow the excess electrolyte through the cell before applying the charge current. According to this aspect, the zinc oxide on the plate can be rapidly cleaned off before electrical charging is commenced, making for better zinc plate cyclability.

Figures 5, 6A:
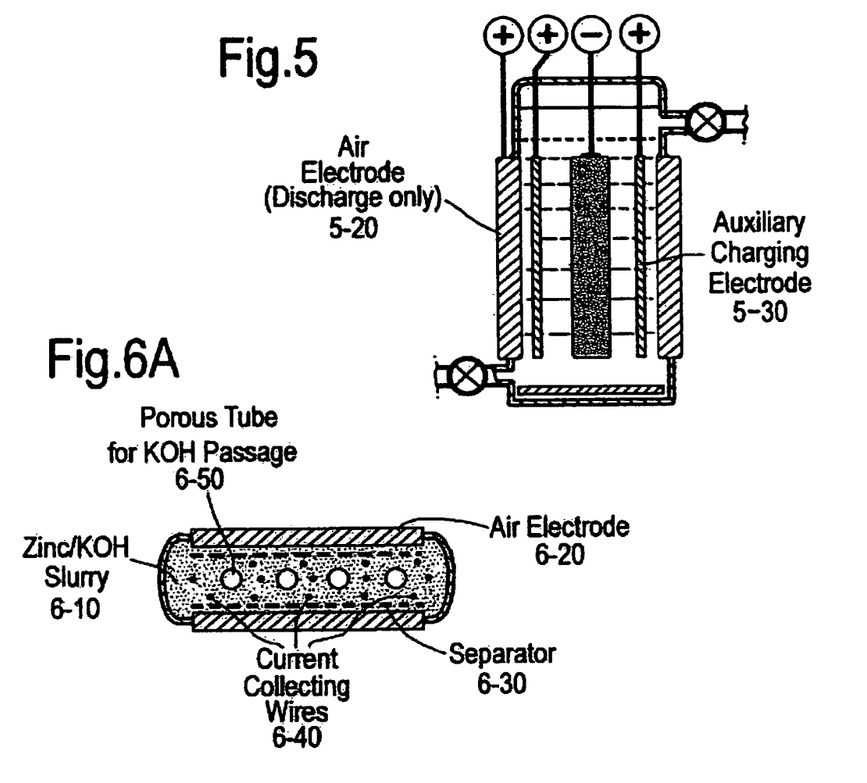
FIG. 5 depicts another embodiment of a metal air cell comprising auxiliary electrodes, for use and incorporation with the apparatuses/methods of this invention.
FIG. 6A depicts a cross sectional view of an embodiment of a zinc air cell comprising a zinc/KOH slurry as the anode.

In some embodiments, a simple geometry KOH-inert support for the zinc, such as a nickel or nickel plated steel sheet or foil, suitably processed, can be used in accordance with the invention. In some embodiments, a highly porous metallic support matrix, such as a sintered, mesh, fibrous, foam or sponge structure, suitably processed, is to be incorporated, and making use of freely electrolyte permeable in flow-by or flow-through modes and the zinc deposit can uniformly build up during charge. Such a conductive matrix offers, in, some embodiments, a stable anode-cathode separation during discharge, while the matrix maintains a more uniform electrical conductivity distribution as insulating zinc oxide builds up on discharge. In some embodiments, the invention may make use of air electrodes designed for discharge only, the cell may incorporate auxiliary electrodes situated between the zinc electrode and the air electrode (e.g. based on a lightweight catalyzed mesh for recharge, for example, as depicted in FIG. 5) 5-30. In this embodiment, the cell comprises a zinc electrode 5-10, two air electrodes, 5-20 and two auxiliary charging electrodes 5-30 applying current towards the zinc electrode on the charging mode.

Use of auxiliary electrodes may provide an added benefit, in some embodiments, of allowing for higher charge currents and thus faster cell recharging. In some embodiments, simpler configurations may be envisioned, where bi-functional type air electrodes may be used.

In some embodiments, a modified cell and charging scheme as described herein may be envisioned.

In another embodiment, the zinc-air cell comprises
a casing comprising an inlet and an outlet;
at least one porous structure capable of absorbing oxygen from the air as the cathode of said cell placed within said casing;
a slurry consisting of zinc and potassium hydroxide solution or NaOH solution placed within said casing;
a separator positioned between said porous structure and said slurry;
elongated conductors placed in said casing and in contact with said slurry;
at least one porous tube which is placed in said casing, in contact with said slurry, and spans a said casing such that a portion of said porous tube protrudes from said casing, wherein said porous tube is so constructed so as to facilitate d potassium hydroxide solution or NaOH solution passage there-through; and
wherein said anode and cathode are electrically connectible across a load and whereby said inlet and outlet permit exchange of said slurry, introduction and exchange of electrolyte fluid or a combination thereof in said cell with a slurry, an electrolyte fluid, or a combination thereof located in an off-board reservoir.

According to this aspect and in some embodiments, the porous tube is comprised of any alkaline resistant material, for example, polypropylene, Teflon, nylon, polyethylene, polyvinyl chloride, polystyrene, polyphenylene oxide etc.

In some embodiments, the elongated conductors are current collecting wires or strips. In some embodiments, an elongated conductor of this invention may be an open metallic or carbon based foam or mat that entrains and provides conductive contact to zinc particles during the pumping into the cell of the slurry for recharge and during the subsequent discharge.

Figure 6B:
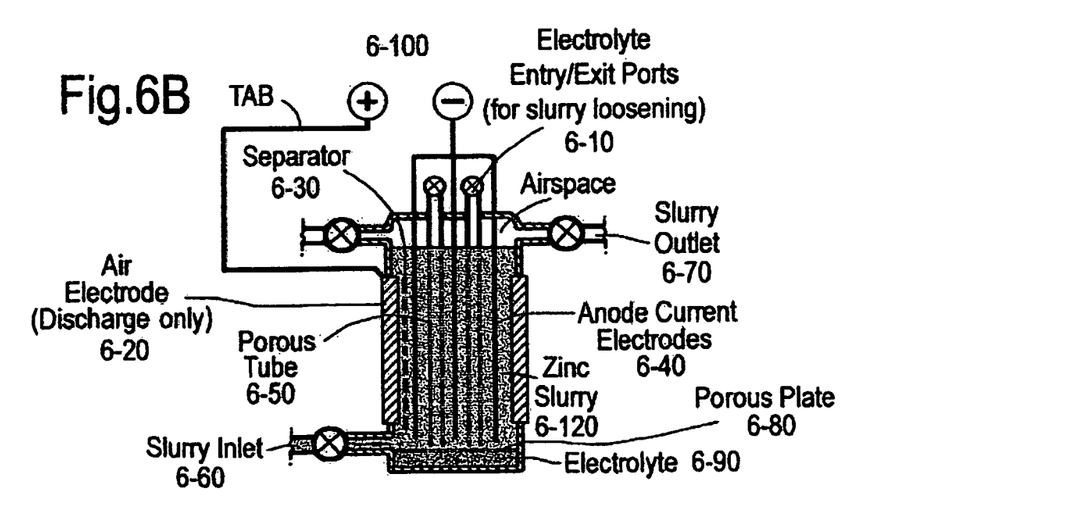
FIG. 6B depicts a longitudinal view of an embodiment of a zinc air cell comprising a zinc/KOH slurry as the anode.

According to this aspect, and in some embodiments, the active zinc material is a zinc powder/KOH or zinc powder/NaOH slurry, or other metal slurry as described herein, which can be pumped in and out of the cell. The elongated current collector for such a flowable anode slurry would be an open wire brush-like structure 6-40 and the anode space would contain, in some embodiments, at least one porous walled tube 6-50 (see FIG. 6A, top view). As is depicted in this illustration, the air electrodes 6-20 are positioned at the termini of the casing, with a zinc/KOH-containing or zinc/NaOH-containing slurry localized there-between 6-10, and the elongated conductors 6-40 are positioned within the slurry, as is the porous walled tube 6-50. FIG. 6B shows a longitudinal view of an embodiment of this aspect of the invention, where a pair of separators 6-30 are positioned next to the slurry, wetted by the slurry but separating the air electrodes 6-20 from the slurry. The electrical connection to the right hand air electrode is not shown. Positioning of the current collector 6-40 and the porous walled tube 6-50 for electrolyte entry and exit for slurry renewal is shown. The positioning of the inlet 6-60 and outlet 6-70 within the casing is evident in this illustration, as well. It is also possible to include in such cells/batteries, an additional porous substrate 6-80 or plate, underneath which is placed free electrolyte 6-90 and power may be taken from the terminals 6-100. Thus, in one embodiment, according to this aspect, the cell may be flushed with electrolyte to be introduced, both in the main compartment and the compartment created beneath the porous substrate or plate.

During cell discharge, the zinc in the slurry would convert to zinc oxide as before. To carry out "recharge", electrolyte from an external reservoir would first be pumped through the spent anode via the porous walled tubes, which would rapidly dissolve the zinc oxide component, loosening the slurry and enabling its facile pump-out from the cells. The cell would then be recharged simply by pumping in fresh slurry from a slurry reservoir without any electrical recharging needed. According to this aspect, refueling can be quite fast (minutes). The spent slurry removed from the cell would be externally regenerated by electrolysis in a regeneration cell, regenerating zinc power on the cathode (for example, removable by periodic scraping) and evolving oxygen from an inert anode. The zinc powder would be reformed into fresh slurry by mixing with KOH, including additives, as necessary (for example, thickener, inert electrically conducting powder, etc.).

When externally regenerating zinc from a discharged slurry, the zinc oxide discharge product is dissolved in excess electrolyte, and from this solution zinc powder can be regenerated electrolytically. Fresh slurry can then be reformulated from the zinc powder by adding electrolyte and any additives. In one electrolytic route, zinc is deposited on the cathode of a regeneration cell and oxygen is evolved from the anode in this cell. The cell reaction is:

$$2ZnO = 2Zn + O_2 \qquad \text{Eq. 3.}$$

In an alternative route for slurry regeneration from electrolyte, zinc is deposited on the cathode of a regeneration cell as before, but the anode in that cell is a porous electrode for hydrogen oxidation. The cell reaction is:

$$ZnO+H_2=Zn+H_2O \quad \text{Eq. 4}$$

The hydrogen would be normally supplied by reforming of natural gas and the cell driven by a much lower potential than required in Eq. 3 and such a process is superior energetically to Eq. 3.

While Zinc/KOH slurries are described herein, it is noted that additional metal slurry/air cell configurations are possible, including the use of iron, aluminum, magnesium, silicon and others, as will be appreciated by the skilled artisan. Alternative electrolytes to KOH, such as NaOH, salt solutions or ionic liquids are also applicable, and represent contemplated embodiments for any aspect of the invention as herein described. In some embodiments, such electrolytes may be incorporated within any system as herein described, or inn some embodiments, such electrolytes may be incorporated within any air cell as herein described, or in some embodiments, such electrolytes may be incorporated within any slurry, as herein described. Where regeneration of the elemental components is not readily accomplished electrochemically, following slurry removal from the cell/battery, additional steps may be necessary and such steps/methods are well known in the art.

In other embodiments, conventional polymer bonded carbon based air electrodes and state of the art robust air electrodes whether of the primary or bi-functional type, may be utilized and incorporated within the materials and methods of this invention.

In some embodiments, the invention provides therefore for a metal-air cell, which in some embodiments is a zinc-air cell(s) with low volume zinc and electrolyte inventory which are connected to an off-board reservoir comprising an alkaline electrolyte solution, for example, KOH with dissolved ZnO that is pumped through the cell during electrical recharge, where the air electrodes are most simply bi-functional.

In some embodiments, the pumping stage precedes the charging stage to allow cleaning of the ZnO from the zinc electrode substrate. In some embodiments, when charging occurs, auxiliary electrodes (not the air electrodes themselves) may be used to effect the charging, instead of the air electrodes.

In some embodiments, the cells/batteries for use in accordance with the methods/apparatuses of this invention will comprise an anode, which is not a flat plate but rather a developed porous structure, for example, comprising a metal or metal alloy, which structure allows for fast charging of the zinc (anode) substrate. In some embodiments, the anode is a graphite/carbon sponge into which the zinc plates on charge.

In some embodiments, the cells/batteries for use in accordance with the methods/apparatuses of this invention comprise a primary zinc-air cell with a high-capacity zinc deposit on the anode, only partially discharged each cycle, where the resultant ZnO product on the anode is cleaned off each time by flowing electrolyte from the reservoir, and only requiring electrical recharge once every few cycles.

In some embodiments, the cells/batteries for use in accordance with the methods/apparatuses of this invention comprise a primary zinc-air cell with a zinc powder/KOH anode slurry where the cell is recharged by fluidly replacing the spent zinc/KOH slurry anode with fresh slurry and the spent slurry in the cell is loosened for pumping out (for off-board regeneration) by exposure to electrolyte flowing through porous pipes in the anode (for very fast recharge).

In some embodiments, the repeated plating and discharge of the zinc in the cell, in using conventional metal-air/zinc-air cells, may result in metallic zinc plated on the anode during charge to occasionally partially detach from the anode to fall to the bottom of the cell. Since metallic zinc is not directly soluble in KOH it could interfere with electrolyte transfer between cells on pumping, even causing a short. This could be dealt with (see FIG. 7) by affixing on the internal base of a cell an electrically floating metal mesh coated with an electrocatalyst for hydrogen evolution (e.g. catalytic metal or catalytic metal oxide compositions as known in the art). Zinc particles on falling to the base of the cell will come into contact with the mesh, spontaneously oxidizing to ZnO in the cell electrolyte (along with some hydrogen evolution) and dissolve away, see Eq. 2, $$Zn+H_2O=ZnO \text{ (dissolves)}+H_2 \quad \text{Eq. 2}$$

In some embodiments, the invention provides a zinc-air cell comprising
  a zinc-containing anode comprising:
    at least one electrically conducting porous support for zinc incorporation there-within;
    a porous polymer-based mat positioned proximally to said porous support; and
  an outer coating, mesh or wire assembly positioned proximally to said porous polymer-based mat and distal to said porous support and comprising an electrocatalyst for hydrogen evolution in the presence of zinc at least one porous structure capable of absorbing oxygen from the air as the cathode of said cell;
  a casing in which said anode and cathode are positioned further comprising an alkaline electrolyte fluid;
  optionally an inlet and outlet in said casing, whereby said inlet and outlet are constructed so as to permit exchange of said electrolyte fluid in said cell with an electrolyte fluid located in an off-board reservoir; and
  optionally at least a first separator positioned within said cell between said anode and said cathode
  wherein said anode and cathode are electrically connectible across a load.

In some embodiments, the porous polymer-based mat is comprised of teflon, nylon, polypropylene or polyethylene, or in some embodiments, the mat is comprised of any alkaline resistant material which does not have a connection to an external stimulus.

Figure 7:
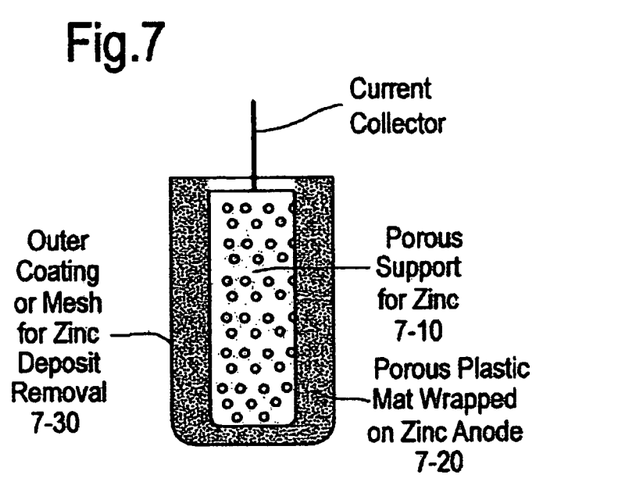
FIG. 7 depicts an embodiment of a layered anode of a metal air cell of this invention.

Referring to FIG. 7, the porous support for zinc incorporation is shown 7-10, enveloped by a porous plastic mat 7-20, effectively wrapping the anode, as described, onto which is placed another outer coating or mesh 7-30, for zinc dendrite removal.

Figure 8:
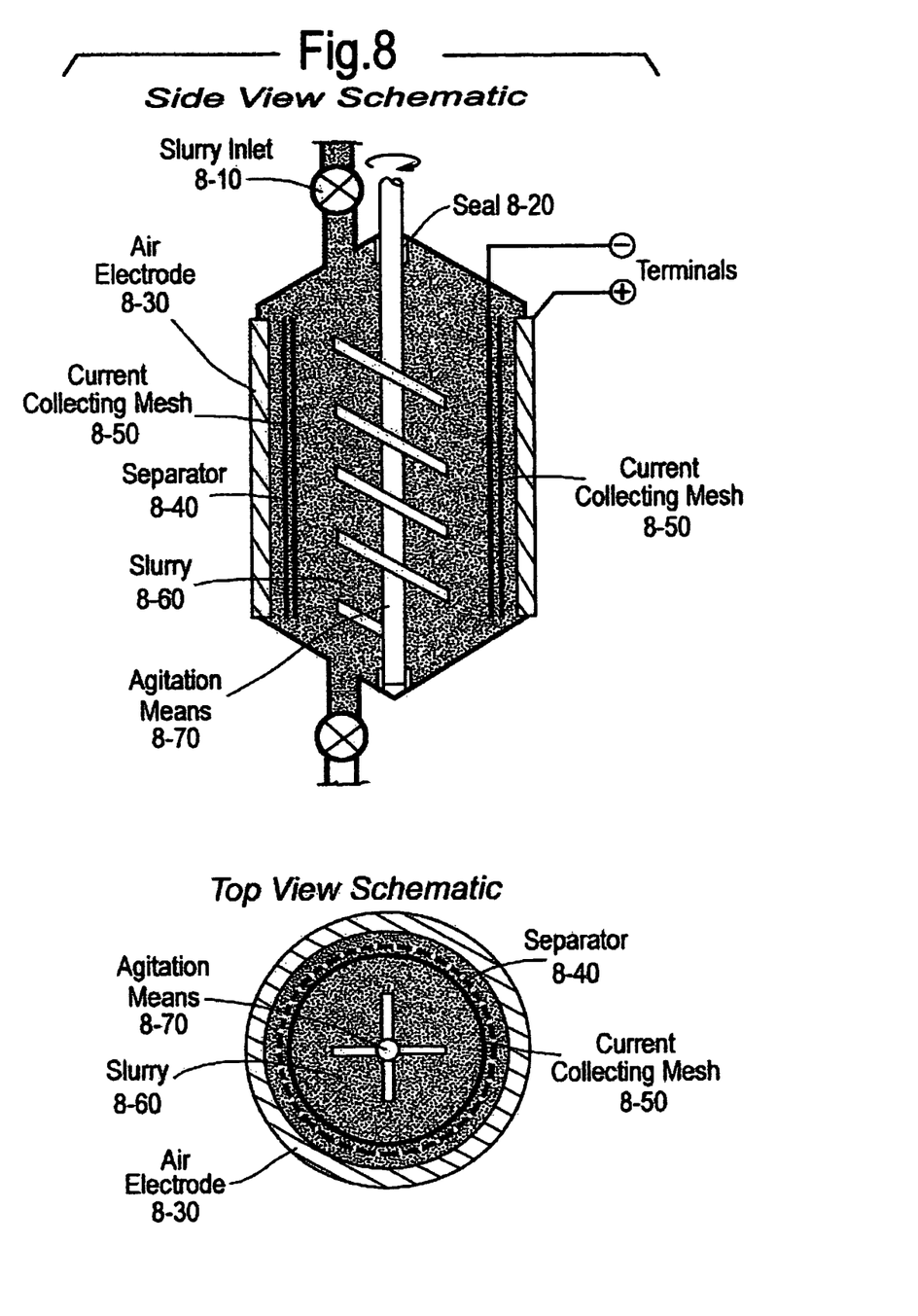
FIG. 8 depicts an embodiment of a refuelable slurry type primary cell of this invention.

Referring to FIG. 8, the invention provides another embodiment of a further means to ensure a zinc-air cell with high energy density and minimal auxiliaries. According to this aspect, and in some embodiments, a self-contained cylindrical cell approach may be undertaken for a refuelable slurry type primary cell. The outer wall of the (vertical) cylinder comprises an air electrode 8-30 fitted inside with a separator layer 8-40 and then a close-placed open metal mesh 8-50 acting as anode current collector and pressing against the separator. The cell in tube form is fitted with a top placed valve 8-10 for filling the cell and a bottom placed valve 8-80 for emptying the cell after discharge. The cell is filled with slurry of zinc particles 8-60 and limited volume KOH solution with the zinc particle size selected from 50 microns up to a few millimeters. In the center of the cell is provided agitation means 8-70 for example a paddle, impeller or worm of a lightweight material like plastic, whose axis passes via a seal 8-20 out of the top of the cell to a lightweight rotation-providing means such as a motor or turbine (not shown). The agitation means is operable on discharge but also during cell drainage following discharge. During discharge the agitation drives the zinc particles to impact the current collecting mesh, enabling high currents and continuing ablation of the zinc oxide discharge product on the surface of the zinc particles. Similarly on drainage the agitation helps remove the viscous discharge products in the cell. This cell approach is applicable to use of primary type conventional polymer-bonded carbon-based air electrodes or state of the art robust air electrodes. In a multicell battery it is envisioned that many electrically connected standalone tubes of this type could be externally accessed for rapid filling and emptying with slurry at a charging station without the need for plumbing between tubes, a slurry storage tank or an onboard slurry pump.

In some embodiments, the invention provides an apparatus for charging a zinc-air cell or zinc-air battery, said apparatus comprising:
  a reservoir, said reservoir comprising:
    a zinc-containing alkaline electrolyte fluid;
  an export feed operationally connected to said reservoir;
  a fluid drainer; and
  optionally a second discharge reservoir;
  whereby:
    said apparatus is operationally connectible to said zinc-air cell or zinc-air battery for which charging is desired;
    said reservoir of said apparatus is located externally to a device containing a zinc-air cell or zinc-air battery for which charging is desired and said export feed allows for the delivery of said zinc-containing alkaline electrolyte fluid from said reservoir to said zinc-air cell or zinc-air battery for which charging is desired;
    said fluid drainer is operationally connectible to said device containing said zinc-air cell or zinc-air battery and facilitates draining of at least a portion of an electrolyte fluid located in a discharged or not fully charged zinc-air cell or zinc-air battery in said device; and
    said drained electrolyte fluid is conveyed to said reservoir or optionally said drained electrolyte fluid is conveyed to said second discharge reservoir.

The apparatus of this invention incorporates a reservoir, which reservoir comprises a zinc-containing alkaline electrolyte fluid. It will be appreciated by the skilled artisan, that the term "zinc-containing alkaline electrolyte fluid" will be any appropriate electrolyte fluid for use in accordance with the described zinc-air cells or batteries as herein described, which contains an appropriate form of zinc or a zinc-containing compound, for example, zinc oxide. It will be appreciated that the term "zinc-containing alkaline electrolyte fluid" for incorporation within the apparatuses of this invention may contain elemental zinc or zinc oxide, as will be appropriate and suitable for the corresponding zinc-air cell or zinc-air battery being attached to an apparatus as herein described, and as will be understood by the skilled artisan.

In some embodiments, for example as depicted in FIG. 4, the electrolyte fluid conveyed to the metal-air cell from the reservoir is concurrent with drainage of electrolyte fluid to the same reservoir, or in some embodiments, the drained electrolyte fluid is optionally drained to a second discharge reservoir.

The term "reservoir" as used herein refers to any receptacle capable of storing an alkaline electrolyte solution for delivery to the metal-air/zinc-air cells as herein described. In some embodiments, such reservoir is envisioned as being located in a service station, for recharging multiple metal-air/zinc-air cells, as needed, with a volume and dimension to be feasible for mass usage. In some embodiments, such reservoir is bounded by an appropriate material to prevent leakage of the solution, and in some embodiments, such reservoir may be stored under- or above-ground, as needed.

In some embodiments, the drainer is a pipe, tubing, siphon or other means by which fluid may be drawn from the indicated source and conveyed to the desired container. In some embodiments, the drainer may be connected to a pump to speed fluid drainage, or in some embodiments, the drainer may be further operationally connected to a filter, a converter, or other materials and then delivered to the desired repository.

In some embodiments, the export feed is similarly a pipe, tubing, siphon or other means by which fluid may be delivered to the metal-air or zinc-air cell/battery from the reservoir. In some embodiments, the export feed may also be connected to a pump, a filter, or other machinery to aid in the delivery of electrolyte fluid of a desired content and for example, purity.

In some embodiments, both the export feed and the drainer are connected to an inlet and outlet, respectively, in a metal-air/zinc-air cell/battery via a valve means, which regulates the flow of electrolyte fluid into and out of the metal-air/zinc-air cell/battery.

It is to be understood that the metal-air/zinc-air cell/battery may be any appropriate metal-air/zinc-air cell/battery, including any embodiment described and/or exemplified herein, and represents an envisioned aspect of this invention. Any metal-air/zinc-air cell/battery known in the art may be utilized in accordance with the apparatuses and/or methods of this invention, and may be modified in some embodiments, to be more compacted versions of the same, and used in accordance with the invention described herein.

In some embodiments, when the apparatuses of this invention are operationally connected to an embodiment of the metal-air/zinc-air cell/battery as described herein, for example, in FIG. 6, or other embodiments of such metal-air/zinc-air cell/battery, which make use of a zinc-KOH containing slurry as the anode of the metal-air/zinc-air cell/battery, then the export feed and drainer will be of a material and sized so as to be appropriate for exchange of the slurry, as herein described.

In some embodiments, in applying the metal-air/zinc-air cell/battery to the apparatuses of this invention, any appropriate concentration of electrolyte solution is envisioned, and some exemplified concentrations of the aqueous KOH envisioned, as common for many alkaline battery systems, is in the range 20-45 wt %. ZnO normally dissolves chemically in such solutions to the extent of 100 gm/L or, if resulting from zinc anode discharge in a cell and helped by dissolved extender additives such as sodium silicate, can reach 200 gm/L. In some embodiments, the solution fed to the cell/battery from the reservoir during recharge would have lower concentrations than these solubility limits, more akin to alkaline zinc plating baths, and the ZnO level may be desired to be maintained between 10-50 gm/L to maintain good plating quality and the ability to be a good dissolving medium of zinc oxide discharge product in the cell anodes.

The reservoir would be changing in zinc ion content between these outer limits, depending on the reservoir size and number of cells/batteries being serviced, for example between maximum 50 gm/L before the cell/battery is charged, and minimum 10 gm/L after the battery is charged. The solution could advantageously be preheated (ZnO dissolves faster than in cold solutions), and may in some embodiments, further contain additives, for example to achieve and maintain desirable zinc plating characteristics such as porosity, and to inhibit self discharge on-stand of the zinc anode. In some embodiments the reservoir could be kept relatively compact by incorporating a filter containing solid phase zinc oxide through which KOH solution is optionally passed in order to reach the desired dissolved zinc oxide concentration.

In some embodiments, the solution composition would be maintained within specified limits at the off-board charging station and buildup of impurities (such as carbonates, impurity metal ions) could be prevented at the reservoir level.

In some embodiments, the apparatus may further comprise a temperature regulator, which temperature regulator controls the temperature of the electrolyte fluid in the reservoir.

In some embodiments, the apparatus may further comprise a flow regulator, which flow regulator controls the flow speed or pressure of electrolyte fluid conveyed from said reservoir or fluid conveyed to said reservoir.

In some embodiments, the apparatus may further comprise a a filter, which filter is operationally connected to said fluid drainer and thereby filters electrolyte fluid conveyed from said air cell, said export feed and thereby filters electrolyte fluid conveyed to said air cell, or a combination thereof.

It is to be understood that any combination of the embodied apparatuses and metal-air or zinc-air cells/batteries as described herein may be combined and represent envisioned aspects of this invention.

In some embodiments, this invention provides a method for recharging a zinc-air cell or zinc-air battery, said method comprising:

contacting a zinc-air cell or zinc-air battery with an apparatus of this invention, such that:
  said export feed of said apparatus is operationally connected to said zinc-air cell and electrolyte fluid can thereby be conveyed from said reservoir to said zinc-air cell; and
  said fluid drainer is operationally connected to said zinc-air cell and electrolyte fluid from said zinc-air cell can be conveyed out of said zinc-air cell thereby;
promoting conveyance of zinc-containing electrolyte fluid from said reservoir to said zinc-air cell via said export feed; and
promoting conveyance of electrolyte fluid from said zinc-air cell to said apparatus via said fluid drainer;

In some embodiments, the air cell comprises a zinc anode and the method strips accumulated zinc oxide from said anode, as described and embodied herein.

In some embodiments, when the electrolyte fluid conveyed from said reservoir to said air cell is a zinc-containing slurry and said electrolyte fluid conveyed from said zinc-air cell to said apparatus is a zinc-containing slurry, then the elements of the apparatus will be appropriate to accommodate the delivery and drainage of such slurry.

In some embodiments, the apparatus further comprises a power supply and said method further comprises applying voltage to said zinc-air cell. In some embodiments, the voltage is applied following a pre-run of electrolyte fluid to strip accumulated ZnO from the anodes, as described herein.

In some embodiments, the zinc-air cell comprises auxiliary electrodes and said power supply applies voltage to said auxiliary electrodes. In some embodiments, the apparatus further comprises a temperature regulator and said temperature regulator controls a temperature of said electrolyte fluid conveyed from said reservoir. In some embodiments, the zinc-air cell comprises a zinc plated metal anode, and said method promotes re-plating of said anode with zinc.

In some embodiments, the apparatus further comprises a scrubber operationally connected to said reservoir, and other elements known and used in the art for recharging metal-air/zinc-air cells/batteries.

In some embodiments, the invention is applicable to all-electric zero-emission vehicles in fleet or individual use. These vehicles may be powered by a high energy zinc-air battery requiring periodic station charging, which may contain the apparatuses according to the present invention (e.g. zinc-air 80 kWh, 200 kg), in tandem with a small power battery (e.g. Li-ion 10 kWh, 125 kg) that can accept home or work charging as well as regenerative braking. Such a combination will allow a range of 40 km with the lithium-ion battery alone and 400 km with both batteries. In some embodiments, the Il-ion battery can deal with short trips, and for long trips the zinc-air battery would be used.

To recharge the zinc-air battery, the vehicle would, in some embodiments, enter a battery exchange station and have its battery mechanically replaced. It can be appreciated that the exchange station may be selected according to the route taken and alerted to the impending battery exchange.

At the station the batteries could be recharged on site, if infrastructure is available, or in some embodiments, discharged batteries may be transported on a daily basis for recharging to a dedicated urban recharge center.

At the urban recharge center batteries may be connected to recharging machines incorporating the apparatuses of this invention. These recharging machines would be designed according to the type of zinc-air battery sent for recharge.

In the electrically recharged type of the present invention, battery cells would be individually connected to electrolyte pumped from an electrolyte reservoir, and electrical charging commenced. This charging would take 1-5 hours and preferably be carried out using off-peak electricity.

In the slurry replacement zinc-air battery of the present invention, machines would replace slurry in battery cells. This slurry replenishment would take 10-30 minutes to provide a fresh battery and discharged slurry would be processed on site by electrochemical regeneration, preferably carried out using off-peak electricity and hydrogen The examples provided herein-below are provided for illustrative purposes alone and are not to be construed in any way as limiting the invention.

While various embodiments of the present invention have been presented, it is possible to use various alternatives, modifications and equivalents. It is to be understood that any feature described herein, may be combined with any other feature described herein. It is to be understood that the article "a", or "an" refers to a quantity of one or more of the item following the article, except where expressly stated otherwise.

The following examples are intended to illustrate but not limit the present invention.

EXAMPLES

Example 1

A zinc-air cell was constructed from two bi-functional air electrodes (10 cm×10 cm×0.1 cm thick) flanking a central zinc anode (as in FIG. 1). The air electrodes were edge-bonded using epoxy to a narrow U-shaped plastic profile such that the internal cell volume was about 40 cc and the cell, which was fitted with electrolyte inlet and outlet vents, was closed with a plastic cover. The zinc anode support was a centrally placed nickel mesh (10 cm×10 cm×0.05 cm thick), 20 holes per cm, that had been flash coated with indium to ensure an adherent zinc coating on zinc electroplating and inhibition of zinc self-discharge. Celgard (trademark) microporous polypropylene separators were bonded at the edges of the air electrodes inside the cell to prevent anode/cathode shorting. On the base of the cell was bonded a nickel mesh coated with porous nickel as hydrogen evolution electrocatalyst, in order to digest any occasional zinc particles falling from the anode. The initial spacing between air and zinc electrodes was about 1 mm and 30 cc electrolyte (30 wt % KOH containing 50 gm/L dissolved ZnO) was used in the cell. For charging the cell was hydraulically connected (using fill tubes connected with the inlet and outlet vents) to a large external electrolyte reservoir (2 L of 30 wt % KOH containing 50 g/L dissolved zinc oxide at 50 deg C.) that was pumped through the cell using an external pump at a pumping rate of 5 cc/minute. The cell electrodes were connected up to a DC power supply and the cell charged at 12 A. After 5.5 h a grey colored, compact, porous, uniform deposit of metallic zinc had built upon the anode support. The electrolyte circulation system was disconnected from the cell at this stage and the cell was discharged at 10 A in static air using only the electrolyte that remained in the cell. The cell OCV was 1.45V and the cell provided 50 Ah at an average working voltage of 1.25V till a cutoff of 0.9V, and it could be seen that the anode had changed in appearance to the white color of zinc oxide. To recharge the cell the electrolyte circulation system was reconnected as before but electrolyte was flowed for 10 minutes before commencing electrical recharge in order to remove residual zinc oxide from the anode support. Following electrical recharge as before, the cell ocv was 1.45V and the cell provided again 50 Ah at an average working voltage of 1.25V till a cutoff of 0.9V, showing the good rechargeability of the system. Energy density of the cell was 350 Wh/kg and energy per volume 800 Wh/kg Example 2

A zinc-air cell was constructed from two primary air electrodes (10 cm×10 cm×0.1 cm thick) flanking a central zinc anode (as in FIG. 3). The air electrodes were edge-bonded using epoxy to a narrow U-shaped plastic profile such that the internal cell volume was about 50 cc and the cell, which was fitted with electrolyte inlet and outlet vents, was closed with a plastic cover. The zinc anode support was a centrally placed steel fiber-based porous plaque (10 cm×10 cm×0.3 cm thick), that had been flash coated with indium to ensure an adherent zinc coating on zinc electroplating and inhibition of zinc self discharge. Between the air electrodes and the zinc anode were two auxiliary charging nickel mesh electrodes that had been coated with an electrocatalyst for oxygen evolution, and these were wrapped in a layer of Celgard (trademark) microporous polypropylene separators to prevent anode/cathode shorting. On the base of the cell was bonded a nickel mesh coated with porous nickel as hydrogen evolution electrocatalyst, in order to digest any occasional zinc particles falling from the anode. The spacing between air and zinc electrodes was about 1 mm and 50 cc electrolyte (30 wt % KOH containing 50 gm/L dissolved ZnO) was used in the cell. For charging the cell was hydraulically connected (using fill tubes connected with the inlet and outlet vents) to a large external electrolyte reservoir (5 L of 30 wt % KOH containing 50 g/L dissolved zinc oxide at 50 deg C.) that was pumped through the cell using an external pump at a pumping rate of 30 cc/minute. The zinc and auxiliary charging electrodes were connected up to a DC power supply and the cell charged at 50 A. After 2.2 h a grey colored, compact, porous, uniform deposit of metallic zinc had built up within the anode support. The electrolyte circulation system was disconnected from the cell at this stage and the cell was discharged at 20 A using flowing air and only the electrolyte that remained in the cell. The cell ocv was 1.45V and the cell provided 100 Ah at an average working voltage of 1.25V till a cutoff of 0.9V, and it could be seen that the anode had changed in appearance to the white color of zinc oxide. To recharge the cell the electrolyte circulation system was reconnected as before but electrolyte was flowed for 20 minutes before commencing electrical recharge in order to remove zinc oxide from the anode support. Following electrical recharge as before, the cell ocv was 1.45V and the cell provided again 100 Ah at an average working voltage of 1.25V till a cutoff of 0.9V, showing the good rechargeability of the system. Energy density of the cell was 400 Wh/kg and energy/volume was 1000 Wh/L.

Example 3

A zinc-air cell was constructed from two primary type air electrodes (10 cm×10 cm×0.1 cm thick) flanking a central zinc anode slurry (as in FIG. 4). The air electrodes were edge-bonded using epoxy to a narrow U-shaped plastic profile such that the internal cell volume was about 80 cc and the cell, which was fitted with slurry inlet and outlet vents, was closed with a plastic cover. Celgard (trademark) microporous polypropylene separators were bonded at the edges of the air electrodes inside the cell to prevent anode/cathode shorting. The anode slurry filled the volume between the two air electrodes and was introduced into the cell from a dosing type slurry pump in five seconds. It was comprised of a suspension of zinc powder (66 wt %) in 34 wt % of electrolyte (30 wt % KOH containing dissolved ZnO 50 g/L). The anode current collector was a brush type structure of nickel wires that dipped into, the slurry, where the wires had been flash coated with indium in order to restrict self discharge of the zinc anode. Also dipping in the slurry were 4 tubes of porous plastic. The cell was discharged at room temperature at 10 A in static air. The cell OCV was 1.45V and the cell provided 50 Ah at an average working voltage of 1.25V till a cutoff of 0.9V. The discharged slurry was now more viscous than before discharge and was difficult to remove from the cell, but on passing electrolyte at 50 deg C. for 5 minutes through the porous tubes in the anode the discharged slurry was loosened and the slurry could be pumped out using the slurry pump. From the cell discharge products slurry could be regenerated electrochemically. A fresh charge of slurry was transferred into the cell and discharge recommenced. Again, the cell OCV was 1.45V and the cell provided 50 Ah at an average working voltage of 1.25V till a cutoff of 0.9V, showing the good recyclability of the system. The energy density of the cell was 400 Wh/kg, and energy per volume 800 Wh/L.

While the disclosure has been illustrated and described, it is not intended to be limited to the details shown, since various modifications and substitutions can be made without departing in any way from the spirit of the present disclosure. As such, further modifications and equivalents of the invention herein disclosed can occur to persons skilled in the art using no more than routine experimentation, and all such modifications and equivalents are believed to be within the spirit and scope of the disclosure as defined by the following claims.

What is claimed is:

1. An apparatus for charging a zinc-air cell or zinc-air battery, said apparatus comprising:
   a. a reservoir, said reservoir comprising:
      i. an alkaline electrolyte fluid containing dissolved zinc oxide; and ii. solid phase zinc oxide;
b. an export feed operationally connected to said reservoir;
c. a fluid drainer; and
wherein:
said apparatus is operationally connectible to said zinc-air cell or zinc-air battery for which charging is desired;
said reservoir of said apparatus is located externally to a device containing a zinc-air cell or zinc-air battery for which charging is desired and said export feed allows for the delivery of said alkaline electrolyte fluid containing dissolved zinc oxide from said reservoir to said zinc-air cell or zinc-air battery for which charging is desired;
said fluid drainer is operationally connectible to said device containing said zinc-air cell or zinc-air battery and facilitates draining of at least a portion of an electrolyte fluid located in a discharged or not fully charged zinc-air cell or zinc-air battery in said device; and
said drained electrolyte fluid is conveyed to said reservoir.

2. The apparatus of claim 1, further comprising at least one pumping element, which pumping element facilitates delivery of said alkaline electrolyte fluid containing dissolved zinc oxide from said reservoir to said zinc-air cell or zinc-air battery for which charging is desired, or which pump facilitates draining of at least a portion of an electrolyte fluid located in a discharged or not fully charged zinc-air cell or zinc-air battery in said device, or a combination thereof.

3. The apparatus of claim 1, wherein said apparatus comprises a power supply for applying voltage which power supply is operationally connectible to said zinc-air cell or zinc-air battery.

4. The apparatus of claim 3, wherein said apparatus further comprises a first controller for the application of said voltage such that said voltage may be applied concurrent with or following said delivery of said zinc-containing electrolyte fluid.

5. The apparatus of claim 1, further comprising a controller for modulating fluid pressure, fluid flow, fluid capacity, electrolyte temperature, voltage, current, the zinc concentration in the electrolyte solution applied, or a combination thereof.

6. The apparatus of claim 1, further comprising and operationally connected to a zinc-air cell comprising:
a. at least one zinc incorporating structure as the anode of said cell;
b. at least one porous structure capable of absorbing oxygen from the air as the cathode of said cell;
c. a casing in which said anode and cathode are positioned further comprising an electrolyte fluid; and
d. an inlet, and outlet in said casing, wherein said inlet and outlet are constructed so as to permit exchange of said electrolyte fluid in said cell with an electrolyte fluid located in an off-board reservoir;
wherein said anode and cathode are electrically connectible across a load.

7. The apparatus of claim 6, further comprising at least a first separator positioned within said cell between said anode and said cathode, wherein said zinc incorporating structure is a porous structure, or wherein said zinc incorporating structure is a conductive substrate comprising a zinc coating or zinc plating, or wherein said electrolyte fluid is potassium hydroxide or sodium hydroxide, or wherein said cell further comprises at least one auxiliary electrode, or wherein said apparatus is operationally connected to a battery comprising two or more of said zinc-air cells, or wherein said two or more zinc-air cells are hydraulically connected.

8. The apparatus of claim 1, further comprising and operationally connected to a zinc-air cell comprising:
a. at least one zinc-containing anode;
b. at least one porous structure capable of absorbing oxygen from the air as the cathode of said cell;
c. a casing in which said anode and cathode are positioned, further comprising an alkaline electrolyte fluid;
d. an inlet; and
e. an outlet;
wherein said inlet and said outlet are located within and traverse said casing, wherein said inlet and outlet are constructed so as to permit exchange of said electrolyte fluid in said cell with alkaline electrolyte fluid containing dissolved zinc oxide located in an off-board reservoir and wherein said anode and cathode are electrically connectible across a load.

9. The apparatus of claim 8, further comprising an electrically floating metal substrate coated with an electrocatalyst, which facilitates hydrogen evolution in the presence of zinc, thereby preventing buildup of particulate zinc within said casing, or wherein said alkaline electrolyte fluid is potassium hydroxide or sodium hydroxide, or wherein said cell further comprises at least one auxiliary cathode placed between a zinc electrode and an air electrode, or wherein said apparatus is operationally connected to a battery comprising two or more of said zinc-air cells, or wherein said two or more zinc-air cells are hydraulically connected.

10. The apparatus of claim 8, further comprising at least a first separator positioned within said cell between said anode and said cathode.

11. The apparatus of claim 1, further comprising a flow regulator, which flow regulator controls the flow speed or pressure of electrolyte fluid conveyed from said reservoir or fluid conveyed to said reservoir, further comprising a filter, which filter is operationally connected to said fluid drainer and thereby filters electrolyte fluid conveyed from said air cell, said export feed and thereby filters electrolyte fluid conveyed to said air cell, or a combination thereof.

12. The apparatus of claim 1, further comprising a second discharge reservoir such that said drained electrolyte fluid from said discharged or not fully charged zinc-air cell or zinc-air battery is conveyed to said second discharge reservoir.

13. A method for recharging a zinc-air cell or zinc-air battery, said method comprising:
A. contacting a zinc-air cell or zinc-air battery with an apparatus for charging a zinc-air cell or zinc-air battery, said apparatus comprising:
a. a reservoir, said reservoir comprising:
i. an alkaline electrolyte fluid containing dissolved zinc oxide; and
ii. solid phase zinc oxide;
b. an export feed operationally connected to said reservoir;
c. a fluid drainer; and
wherein:
said apparatus is operationally connectible to said zinc-air cell or zinc-air battery for which charging is desired;
said reservoir of said apparatus is located externally to a device containing a zinc-air cell or zinc-air battery for which charging is desired and said export feed allows for the delivery of said alkaline electrolyte fluid containing dissolved zinc oxide from said reservoir to said zinc-air cell or zinc-air battery for which charging is desired;

said fluid drainer is operationally connectible to said device containing said zinc-air cell or zinc-air battery and facilitates draining of at least a portion of an electrolyte fluid located in a discharged or not fully charged zinc-air cell or zinc-air battery in said device; and said drained electrolyte fluid is conveyed to said reservoir or optionally said drained electrolyte fluid is conveyed to said second discharge reservoir such that:
  i. said export feed of said apparatus is operationally connected to said zinc-air cell and electrolyte fluid containing dissolved zinc oxide can thereby be conveyed from said reservoir to said zinc-air cell; and
  ii. said fluid drainer is operationally connected to said zinc-air cell and electrolyte fluid from said zinc-air cell can be conveyed out of said zinc-air cell thereby;

B. promoting conveyance of electrolyte fluid containing dissolved zinc oxide from said reservoir to said zinc-air cell via said export feed; and
  C. promoting conveyance of electrolyte fluid from said zinc-air cell to said apparatus via said fluid drainer.

14. The method of claim 13, wherein said air cell comprises a zinc anode, said electrolyte fluid conveyed from said zinc air cell contains zinc oxide and said method strips accumulated zinc oxide from said anode.

15. The method of claim 13, wherein said zinc-air cell comprises a zinc plated metal anode, said electrolyte comprises zinc oxide and said method promotes re-plating of said anode with zinc.

16. The method of claim 13, wherein said apparatus further comprises a scrubber operationally connected to said reservoir.

* * * * *